United States Patent
Mather et al.

(10) Patent No.: US 7,580,186 B2
(45) Date of Patent: Aug. 25, 2009

(54) MULTIPLE-VIEW DIRECTIONAL DISPLAY

(75) Inventors: Jonathan Mather, Oxford (GB); David J. Montgomery, Oxfordshire (GB); Robert Winlow, Oxford (GB); Grant Bourhill, Stow-on-the-Wold (GB); Neil W. Barrett, Walsall (GB)

(73) Assignee: Sharp Kabushiki Kaisha, Osaka (JP)

( * ) Notice: Subject to any disclaimer, the term of this patent is extended or adjusted under 35 U.S.C. 154(b) by 129 days.

(21) Appl. No.: 10/927,724

(22) Filed: Aug. 27, 2004

(65) Prior Publication Data

US 2005/0111100 A1 May 26, 2005

(30) Foreign Application Priority Data

Aug. 30, 2003 (GB) .................................. 0320367.6

(51) Int. Cl.
*G02B 27/22* (2006.01)
*G02B 27/10* (2006.01)

(52) U.S. Cl. .................. 359/463; 359/621; 359/464

(58) Field of Classification Search ............... 359/462, 359/463, 464, 621–625, 626, 458; 348/59, 348/54; 345/6
See application file for complete search history.

(56) References Cited

U.S. PATENT DOCUMENTS

| | | | |
|---|---|---|---|
| 2,258,164 A * | 10/1941 | de Lassus Saint Genies | 359/458 |
| 4,621,897 A * | 11/1986 | Bonnet | 359/462 |
| 5,202,793 A * | 4/1993 | Auge | 359/463 |
| 5,703,717 A | 12/1997 | Ezra et al. | |
| 5,754,344 A * | 5/1998 | Fujiyama | 359/631 |
| 6,864,862 B2 * | 3/2005 | Sato et al. | 345/32 |
| 7,050,020 B2 * | 5/2006 | Uehara et al. | 345/6 |
| 7,245,430 B2 * | 7/2007 | Kobayashi et al. | 359/464 |

FOREIGN PATENT DOCUMENTS

WO 03/015424 A2 2/2003

OTHER PUBLICATIONS

Korean Office Action for corresponding Application No. 519980961371 dated Mar. 28, 2006.

* cited by examiner

*Primary Examiner*—Audrey Y Chang
(74) *Attorney, Agent, or Firm*—Renner, Otto, Boisselle & Sklar, LLP

(57) ABSTRACT

A multiple view display comprises a display device which displays first and second images in a spatially multiplexed fashion across the display surface. The device cooperates with a parallax optic such as a lenticular screen so as to act as a directional display sub-system directing light from the first and second images in different viewing directions. An optical system, for example comprising a lenticular screen of diverging elements, changes the angular separation of the viewing angle directions, for example so as to increase the angular separation.

16 Claims, 20 Drawing Sheets

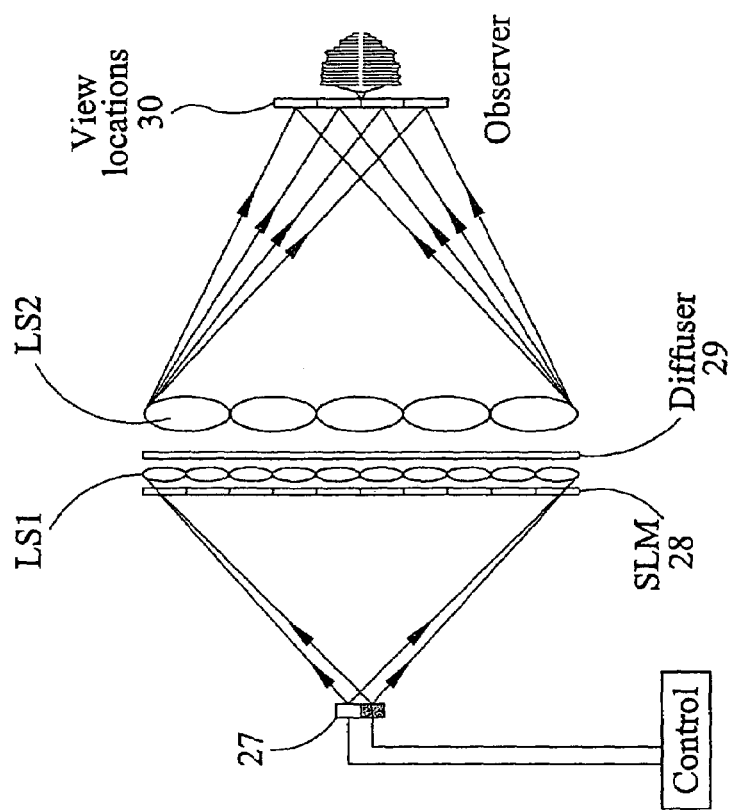
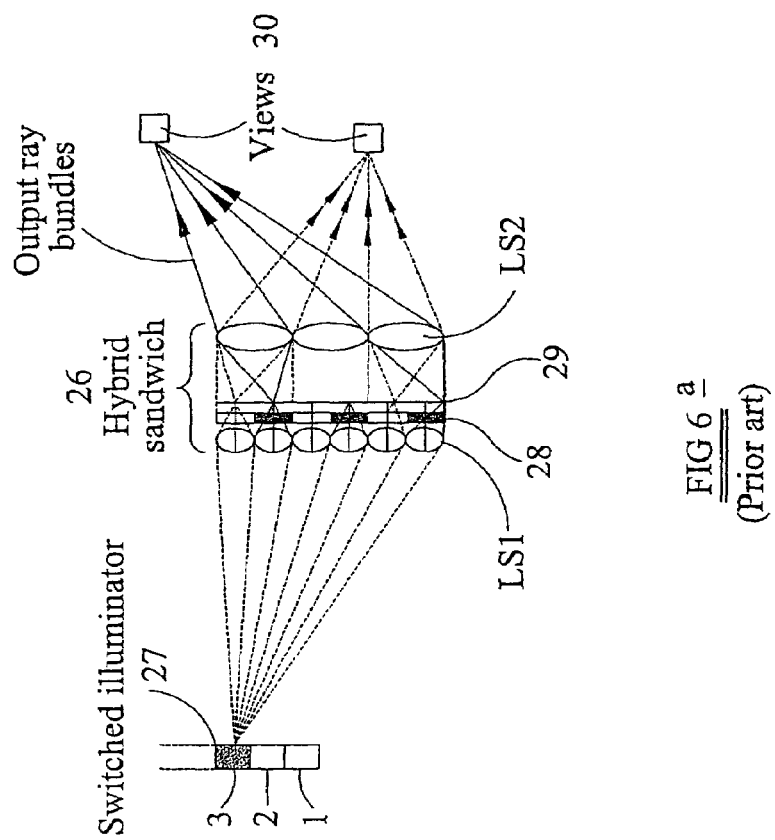
FIG 6 a (Prior art)
FIG 6 b (Prior art)

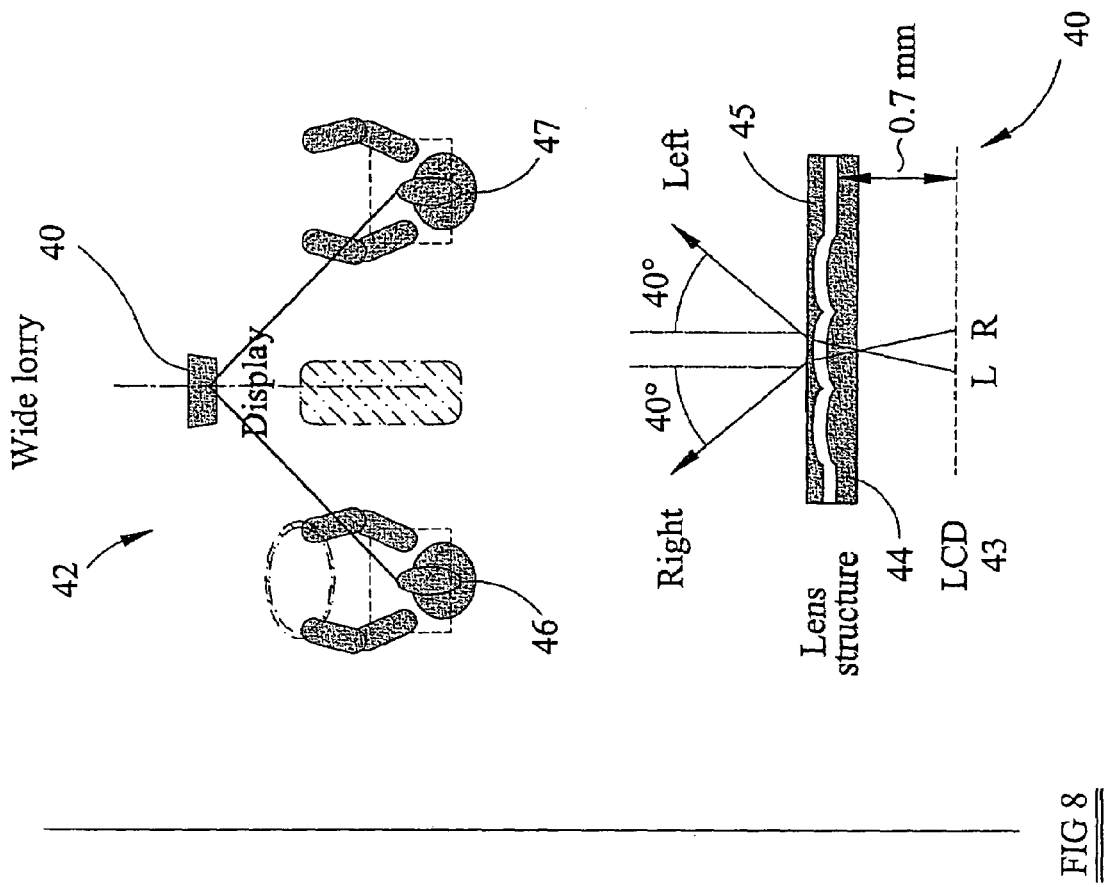
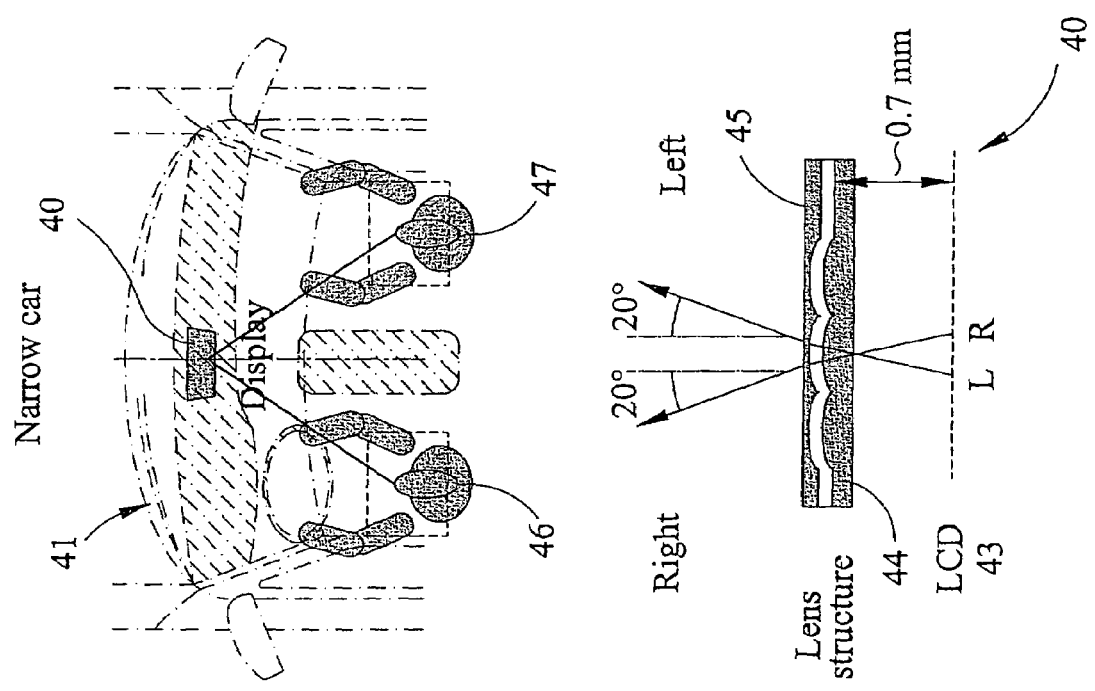
FIG 8

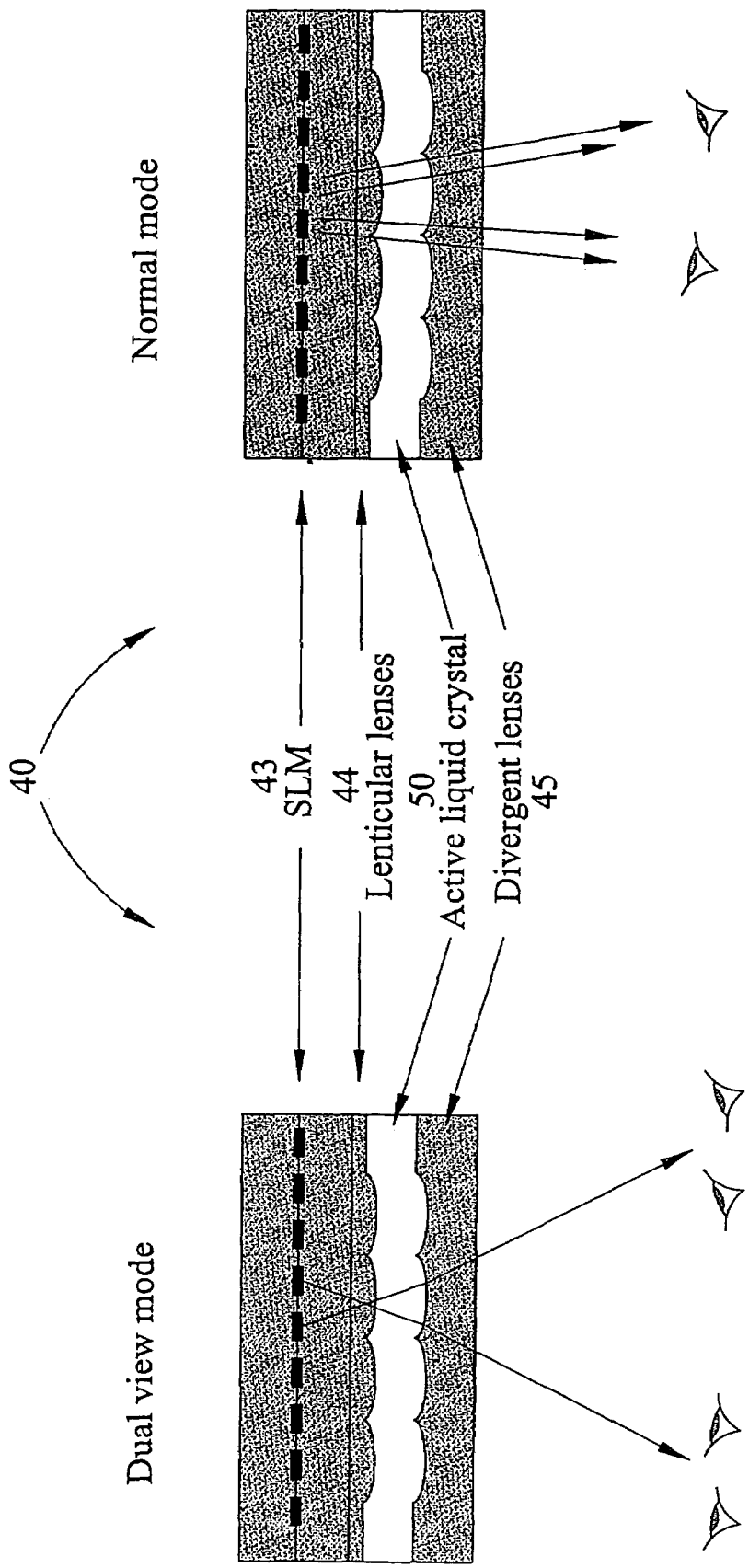

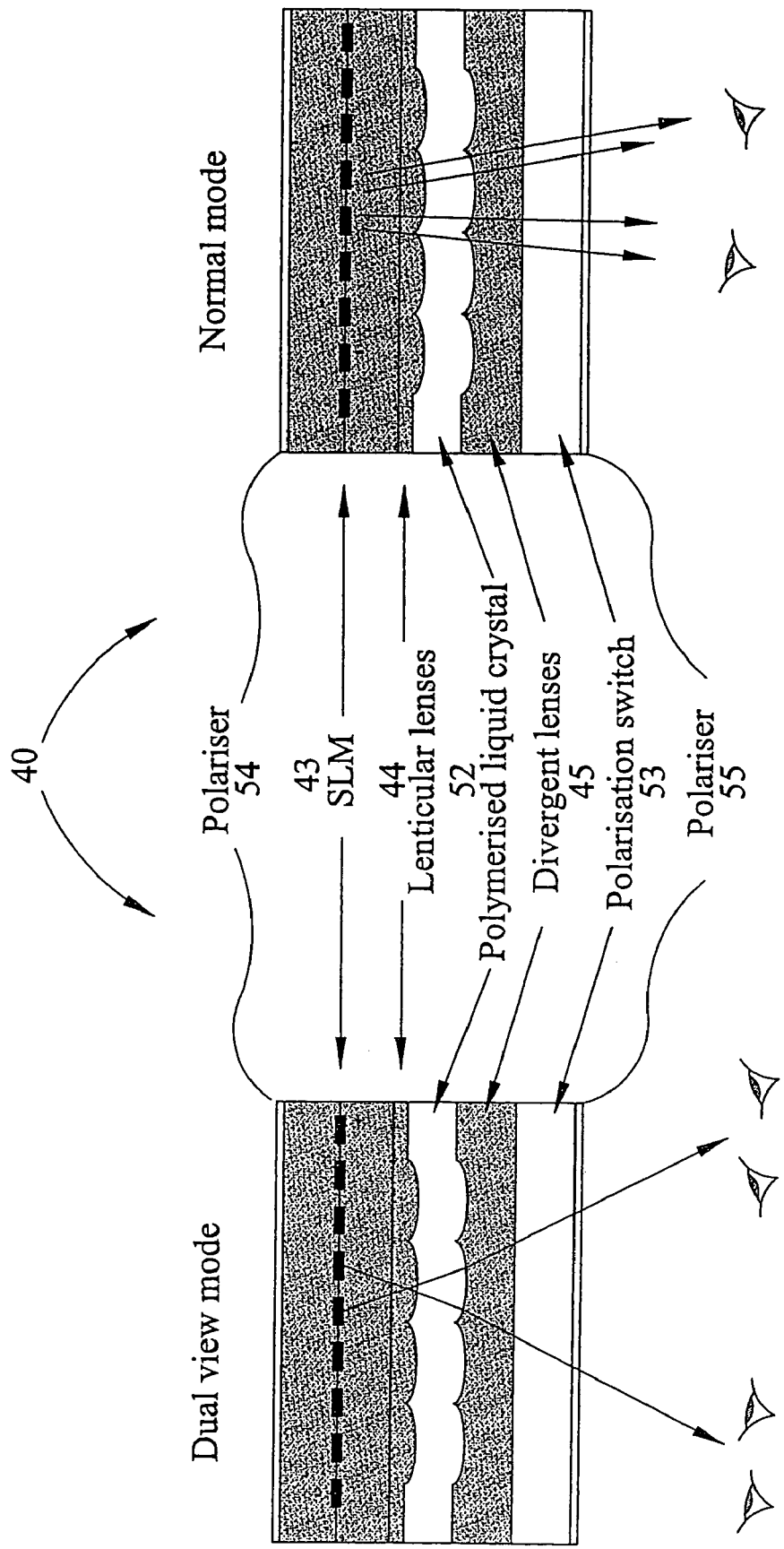

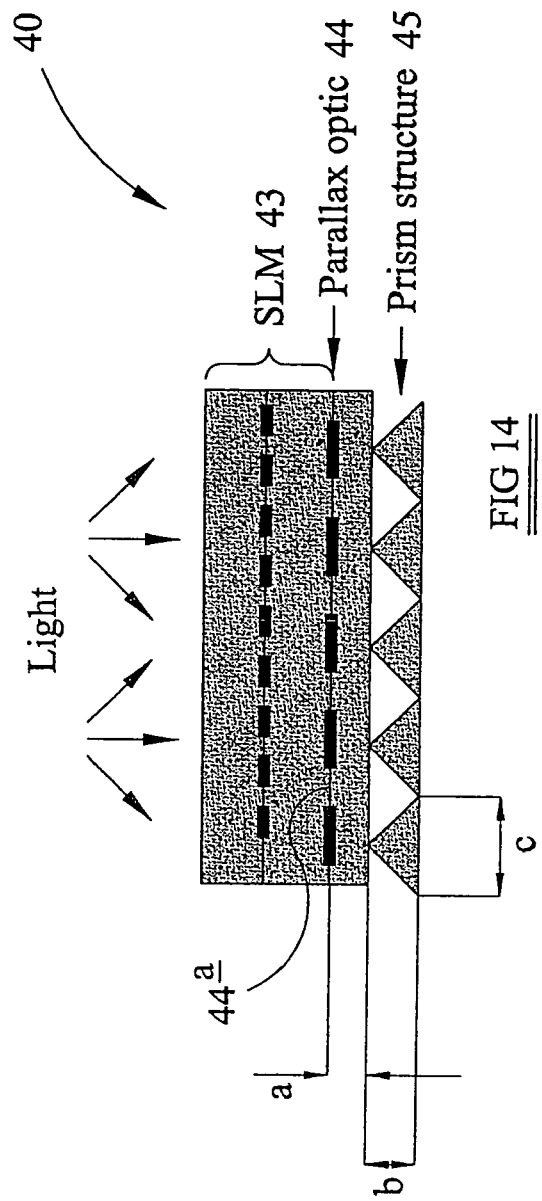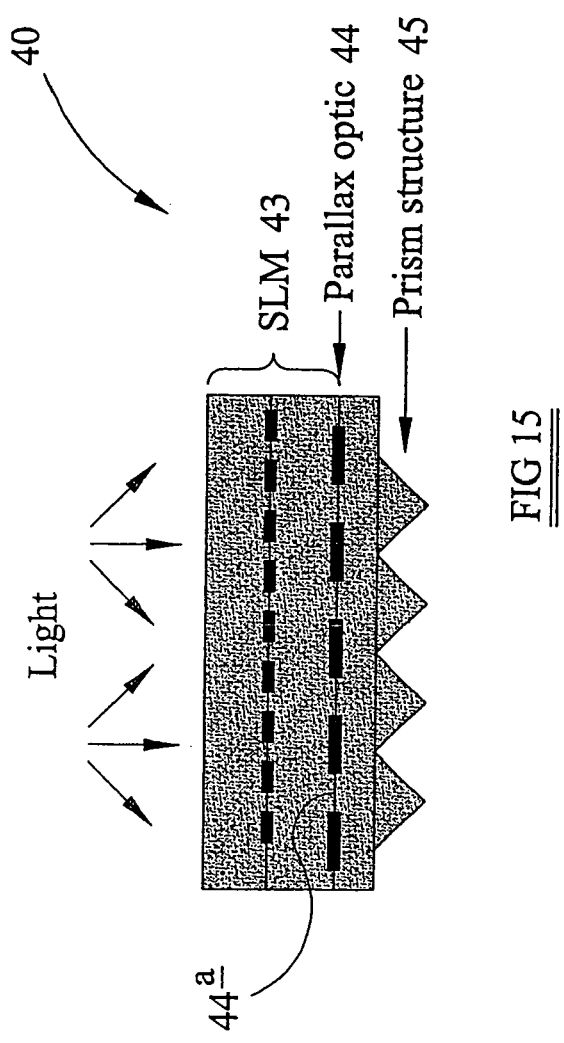

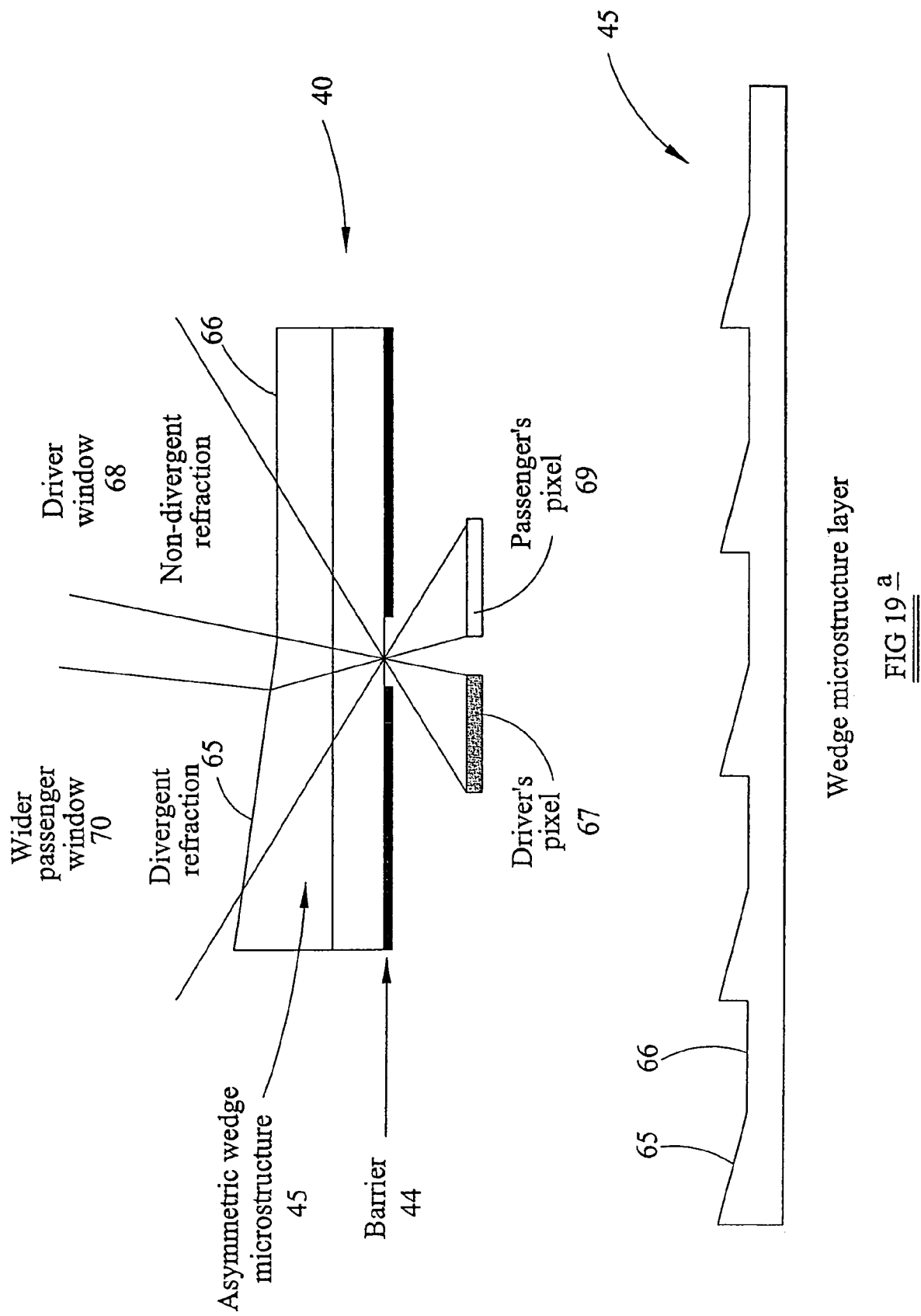

MULTIPLE-VIEW DIRECTIONAL DISPLAY

This Nonprovisional application claims priority under 35 U.S.C. § 119(a) on patent application No. 0320367.6 filed in Great Britain on 30 Aug. 2003, the entire contents of which are hereby incorporated by reference.

TECHNICAL FIELD

The present invention relates to a multiple-view directional display, which displays two or more images such that each image is visible from a different direction. Thus, two or more observers who view the display from different directions will see different images to one another. Such a display may be used as, for example, an autostereoscopic display device or a dual view display device.

BACKGROUND

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data while a passenger may wish to view a film. These conflicting needs could be satisfied by providing two separate display devices, but this would take up extra space and would increase the cost. Furthermore, if two separate displays were used in this example it would be possible for the driver to see the passenger's display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space, is costly, and is not practical for portable games.

To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games.

A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce an autostereoscopic display.

FIG. 1 is a plan view of a conventional multiple view directional display, in this case an autostereoscopic display. The directional display 1 comprises a spatial light modulator (SLM) 4 that constitutes an image display device, and a parallax barrier 5. The SLM of FIG. 1 is in the form of a liquid crystal display (LCD) device having an active matrix thin film transistor (TFT) substrate 6, a counter-substrate 7, and a liquid crystal layer 8 disposed between the substrate and the counter substrate. The SLM is provided with addressing electrodes (not shown) which define a plurality of independently-addressable picture elements, and is also provided with alignment layers (not shown) for aligning the liquid crystal layer. Viewing angle enhancement films 9 and linear polarisers 10 are provided on the outer surface of each substrate 6, 7. Illumination 11 is supplied from a backlight (not shown).

The parallax barrier 5 comprises a substrate 12 with a parallax barrier aperture array 13 formed on its surface adjacent the SLM 4. The aperture array comprises vertically extending (that is, extending into the plane of the paper in FIG. 1) transparent apertures 15 separated by opaque portions 14. An anti-reflection (AR) coating 16 is formed on the opposite surface of the parallax barrier substrate 12 (which forms the output surface of the display 1).

The pixels of the SLM 4 are arranged in rows and columns with the columns extending into the plane of the paper in FIG. 1. The pixel pitch (the distance from the centre of one pixel to the centre of an adjacent pixel) in the row or horizontal direction is p. The width of the vertically-extending transmissive slits 15 of the aperture array 13 is 2w and the horizontal pitch of the transmissive slits 15 is b. The plane of the barrier aperture array 13 is spaced from the plane of the liquid crystal layer 8 by a distance s.

A driving arrangement 20 is provided for supplying the appropriate signals to the SLM 4 so that it displays the left and right eye images. In particular, these images are spatially multiplexed on the SLM 4 at alternating columns of the pixels.

In use, the display device 1 forms a left-eye image and a right-eye image, and an observer who positions their head such that their left and right eyes are coincident with the left-eye viewing window 2 and the right-eye viewing window 3, respectively, will see a three-dimensional image. The left and right viewing windows 2,3 are formed in a window plane 17 at the desired viewing distance from the display. The window plane is spaced from the plane of the aperture array 13 by a distance $r_o$. The windows 2,3 are contiguous in the window plane and have a pitch e corresponding to the average separation between the two eyes of a human. The half angle to the centre of each window 10, 11 from the normal axis of the display is α.

The pitch of the slits 15 in the parallax barrier 5 is chosen to be close to an integer multiple of the pixel pitch of the SLM 4 so that groups of columns of pixels are associated with a specific slit of the parallax barrier. FIG. 1 shows a display device in which two pixel columns of the SLM 4 are associated with each transmissive slit 15 of the parallax barrier.

FIG. 2 shows the angular zones of light created from an SLM 4 and parallax barrier 5 where the parallax barrier has a pitch of an exact integer multiple of the pixel column pitch. In this case, the angular zones coming from different locations across the display panel surface intermix and a pure zone of view for image 1 or image 2 (where 'image 1' and 'image 2' denote the two images displayed by the SLM 4) does not exist. In order to address this, the pitch of the parallax barrier is preferably reduced slightly so that it is slightly less than an integer multiple of the pixel column pitch. As a result, the angular zones converge at a pre-defined plane (the "window plane") in front of the display. This is known as viewpoint correction and is illustrated in FIG. 3 of the accompanying drawings, which shows the image zones created by an SLM 4 and a modified parallax barrier 5'. The viewing regions, when created in this way, are roughly kite-shaped in plan view.

FIG. 4 is a plan view of another conventional multiple view directional display device 1'. This corresponds generally to the display device 1 of FIG. 1, except that the parallax barrier 5 is placed behind the SLM 4, so that it is between the backlight and the SLM 4. This device may have the advantages that the parallax barrier is less visible to an observer, and that the pixels of the display appear to be closer to the front of the device. Furthermore, although FIGS. 1 and 4 each show a transmissive display device illuminated by a backlight, reflective devices that use ambient light (in bright conditions) are known. In the case of a transflective device, the rear parallax barrier of FIG. 4 will absorb none of the ambient lighting. This is an advantage when the display has a 2D mode that uses reflected light.

In the display devices of FIGS. 1 and 4, a parallax barrier is used as the parallax optic. Other types of parallax optic are known. For example, lenticular lens arrays may be used to direct interlaced images in different directions, so as to form a stereoscopic image pair or to form two or more images each seen in a different direction.

Holographic methods of image splitting are known, but in practice these methods suffer from viewing angle problems, pseudoscopic zones and a lack of easy control of the images.

Another type of parallax optic is a micropolariser display, which uses a polarised directional light source and patterned high precision micropolariser elements aligned with the pixels of the SLM. Such a display offers the potential for high window image quality, a compact device, and the ability to switch between a 2D display mode and a 3D display mode. The dominant requirement when using a micropolariser display as a parallax optic is the need to avoid parallax problems when the micropolariser elements are incorporated into the SLM.

Where a colour display is required, each pixel of the SLM 4 is generally given a filter associated with one of the three primary colours. By controlling groups of three pixels, each with a different colour filter, many visible colours may be produced. In an autostereoscopic display each of the stereoscopic image channels must contain sufficient of the colour filters for a balanced colour output. Many SLMs have the colour filters arranged in vertical columns, owing to ease of manufacture, so that all the pixels in a given column have the same colour filter associated with them. If a parallax optic is disposed on such an SLM with three pixel columns associated with each slit or lenslet of the parallax optic, then each viewing region will see pixels of one colour only. Care must be taken with the colour filter layout to avoid this situation. Further details of suitable colour filter layouts are given in EP-A-0 752 610.

The function of the parallax optic in a directional display device such as those shown in FIGS. 1 and 4 is to restrict light transmitted through the pixels of the SLM 4 to certain output angles. This restriction defines the angle of view of each of the pixel columns behind a given element of the parallax optic (such as for example a transmissive slit). The angular range of view of each pixel is determined by the pixel pitch p, the separation s between the plane of the pixels and the plane of the parallax optic, and the refractive index n of the material between the plane of the pixels and the plane of the parallax optic (which in the display of FIG. 1 is the substrate 7). H Yamamoto et al. show, in "Optimum parameters and viewing areas of stereoscopic full-colour LED displays using parallax barrier", IEICE Trans. Electron., vol. E83-C, No. 10, p 1632 (2000), that the angle of separation between images in an autostereoscopic display depends on the distance between the display pixels and the parallax barrier.

The half-angle α of FIG. 1 or 4 is given by:

$$\sin\alpha = n\sin\left(\arctan\left(\frac{p}{2s}\right)\right) \quad (1)$$

One problem with many existing multiple view directional displays is that the angular separation between the two images is too low. In principle, the angle 2α between viewing windows may be increased by increasing the pixel pitch p, decreasing the separation s between the parallax optic and the pixels, or by increasing the refractive index n of the substrate.

Co-pending UK patent application No. 0315171.9 describes novel pixel structures for use with standard parallax barriers which provides a greater angular separation between the viewing windows of a multiple-view directional display. However, it would be desirable to be able to use a standard pixel structure in a multiple-view directional display.

Co-pending UK patent application Nos. 0306516.6 and 0315170.1 propose increasing the angle of separation between the viewing windows of a multiple-view directional display by increasing the effective pitch of the pixels.

EP 1089115 discloses the use of external microlenses to improve the viewing angle incident on specially designed reflective displays for projection applications.

FIG. 5 of the accompanying drawings illustrates an autostereoscopic display of the type disclosed in EP 0656555. The display is of the "beam combiner" type in which the images produced by displays 21 and 22 are combined by a beam combiner 23 and supplied to a projection lens 24. A double lenticular screen angular amplifier 25 is used to amplify the viewing angle separation. The amplifier 25 comprises two lenticular screens or sheets of different focal lengths for changing the viewing angle separation of a projected image. Real images are formed within the optics of the amplifier 25. Also, the lenticules of the amplifier 25 must be relatively remote from the remainder of the display because they are required to re-image the whole of each LCD in the displays 21 and 22.

EP 0597629 discloses an autostereoscopic display which uses two lenticular lens arrays LS1 and LS2 to form what is known as a "hybrid sandwich" 26, as shown in FIGS. 6a and 6b of the accompanying drawings. A controllable array of light sources in the form of a switched illuminator 27 illuminates an SLM 28 either directly as shown in FIG. 6B or via the first array LS 1 as shown in FIG. 6A. Each lenticule is associated with a respective column of pixels of the SLM 28 and focuses light through the column onto a diffuser 29. The different views are then effectively separated by means of the array LS2, which in the illustrated examples has one lenticule for each adjacent pair of pixel columns. Effectively, the array LS2 re-images the image formed on the diffuser 29 to view locations 30 in the window plane of the display.

FIG. 7 of the accompanying drawings illustrates an autostereoscopic display of the type disclosed by Yamamoto et al, "Reduction of the Thickness of Lenticular Stereoscopic Display using Full Colour LED Panel", Proc Spie, vol. 4660, 2002, pp 236.

The display comprises a light emitting diode (LED) panel 31 of very large "poster" size. Two lens arrays in the form of first and second lenticular sheets 32 and 33 are disposed between the panel 31 and a viewer. The display has a relatively large pixel pitch and a long viewing distance. In order to reduce the viewing angle separation, the first lenticular sheet 32 images and de-magnifies the pixels of the panel 31 to a much smaller pitch to provide a lower view angle separation from the second lenticular sheet 33. The focal lengths of the lenticular sheets 32 and 33 are such that the first lenticular sheet 32 focuses the panel 31 to a region between the first and second sheets. The second sheet 33 then re-images the panel to a viewing plane 34.

WO 0301542 discloses an arrangement for providing a 2D to 3D switchable liquid crystal display panel using lenticular lenses.

Schwerdtner et al, "The Dresden 3D Display (D4 D)", SPIE, vol. 3295, pp 203, 1998 discloses the use of a prism structure in an autostereoscopic 3D display. The prism structure is responsible for creating the viewing windows of this display.

U.S. Pat. No. 5,774,262 also discloses the use of a prism structure to form an autostereoscopic 3D display. This display requires the use of a collimated light source. The individual prisms are aligned with pixels and are also used to create the viewing windows of the display.

WO 9827451 discloses an observer tracking system in an autostereoscopic 3D display. Tracking is performed by shifting the pixels relative to a stationery parallax optic in the form of a parallax barrier and prism structure. The combination of the barrier and the prisms is used to create the viewing windows.

Sasagawa et al, "P-51: Dual Directional Backlight for Stereoscopic LCD", Mitsubishi Electric Corporation, SID 2003 Digest, pp 399 discloses a directional backlight having two light sources. One of the light sources illuminates the left eye image whereas the other light source illuminates the right eye image in a time-sequential full-resolution 3D display. A prism structure in combination with lenticular lenses receives light from +60 and −60 directions and redirects the light in +10 and −10 directions. No parallax optic is used in this display.

WO03/015424 discloses an optical switching arrangement forming part of various 3D or multiple view displays. In each case, the optical switching part of the display is a passive birefringent lens array forming a parallax optic of the display. An arrangement for selecting which polarisation of light is output allows the display to be switched between a multiple view mode and a 2D or non-directional mode.

SUMMARY

According to the invention, there is provided a multiple view display comprising: a display device arranged to display spatially multiplexed first and second images; a parallax optic arranged to cooperate with the device to direct light from the first and second images in first and second directions, respectively, with a first angular separation; and an optical system for receiving the light from the first and second directions and for directing the light in first and second viewing directions, respectively, with a second angular separation different from the first angular separation, the parallax optic and the optical system being arranged to form a real image only at or adjacent a display viewing distance in front of the display.

The second angular separation may be greater than the first angular separation.

The optical system may comprise an array of optical elements. Each of the elements may be asymmetric. Each of the elements may comprise a lens. Each lens may be a diverging lens. The lens array may be combined with the parallax optic. The optical system may comprise a further lens array of converging lenses.

Each of the elements may comprise a prism.

Each of the elements may comprise a wedge and a plane non-inclined region.

The array may have a non-plane surface in contact with a matching surface of a first layer of material whose refractive index is controllable. The first layer may have a controllable range of refractive indices including the refractive index of the array. The material of the first layer may be a liquid crystal material.

The array may have a non-plane surface in contact with a matching surface of a second layer of birefringent material. One of the refractive indices of the birefringent material may be substantially equal to the refractive index of the array. The birefringent material may be a polymerised liquid crystal. The display may comprise a polarisation switch for selectively switching the polarisation of light passing through the second layer. The display may comprise a polariser for receiving light from the polarisation switch.

The device may comprise a liquid crystal device.

The display may comprise a driving arrangement for driving the device so as to display the multiplexed first and second images.

It is thus possible to provide a multiple view display in which the angular separation can easily be controlled or selected. The display device and the parallax optic effectively form a multiple view directional display as a sub-system with a viewing angle separation determined as described hereinbefore and the parameters of the optical system may be selected so as to alter the viewing angle separation to that required of the display. The optical system may be manufactured as a separate component so that the sub-system may be standardised and used in a range of applications where different viewing angle separations are required. It is therefore merely necessary to add or attach the appropriate optical system in order to achieve the desired viewing angle separation. During installation of the display, the optical system may be adjusted, for example in respect of its position relative to the display device and the parallax optic, so as to achieve the desired viewing angle separation and the desired viewing angles. The optical system may be adjustable so as to vary the viewing angle separation and the viewing direction, for example to allow a viewer to make adjustments to direct the image towards him within a range of possible viewing positions.

The viewing angle separation may be increased or decreased. If the viewing angle separation is decreased, this may result in a higher brightness of the displayed images and this permits the use of a relatively large separation between the parallax optic and the display device.

BRIEF DESCRIPTION OF THE DRAWINGS

FIGS. 5 to 7 are diagrammatic plan views of known types of displays;

FIG. 8 illustrates diagrammatically two, examples of automotive applications of a multiple view directional display constituting an embodiment of the invention; and FIGS. 9a to 19c are diagrammatic cross-sectional views of multiple view displays constituting embodiments of the invention.

DETAILED DESCRIPTION

Figure 1:
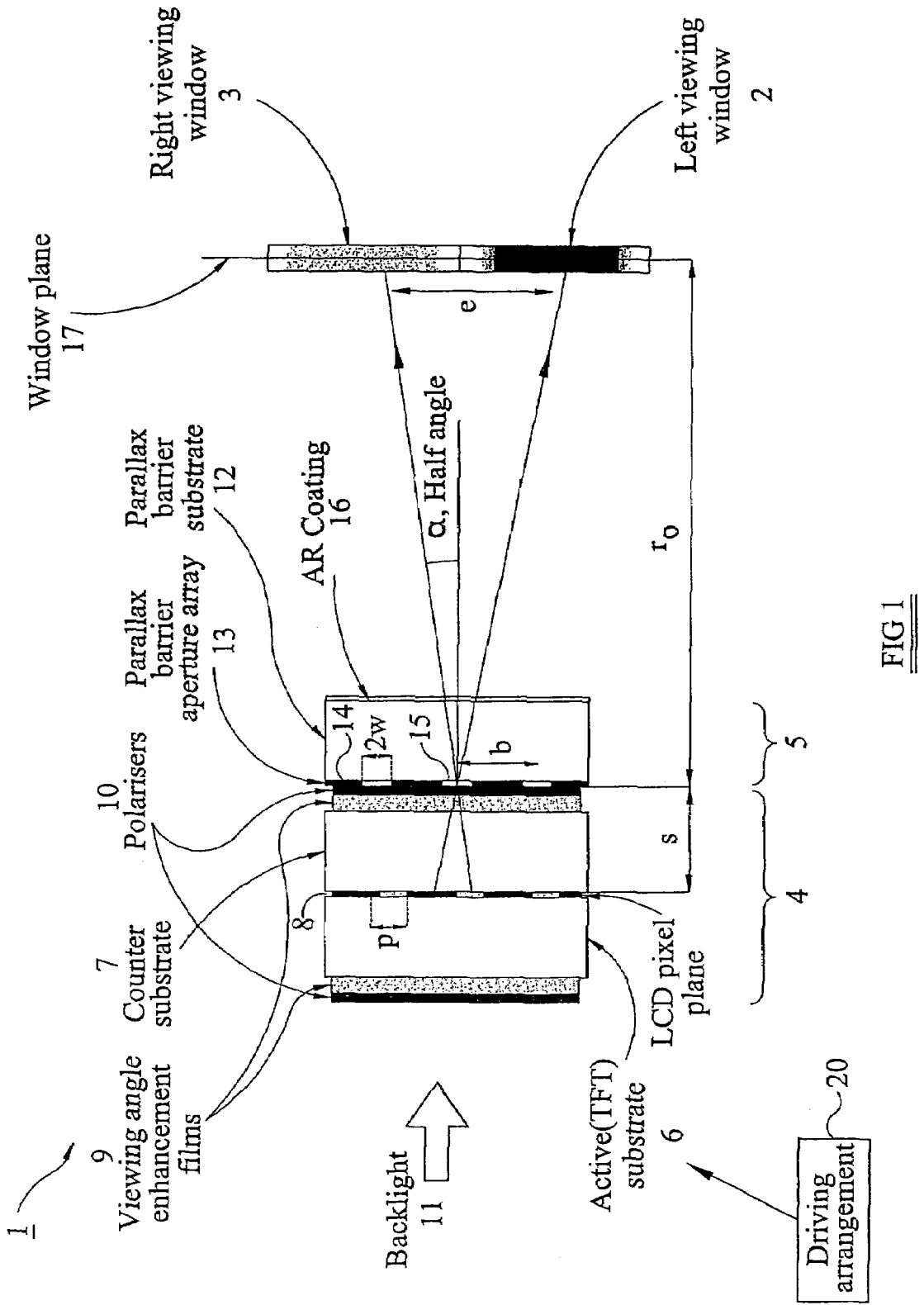
FIG. 1 is a diagrammatic horizontal cross-sectional view of a known type of front barrier autostereoscopic 3D display.
Figure 2:
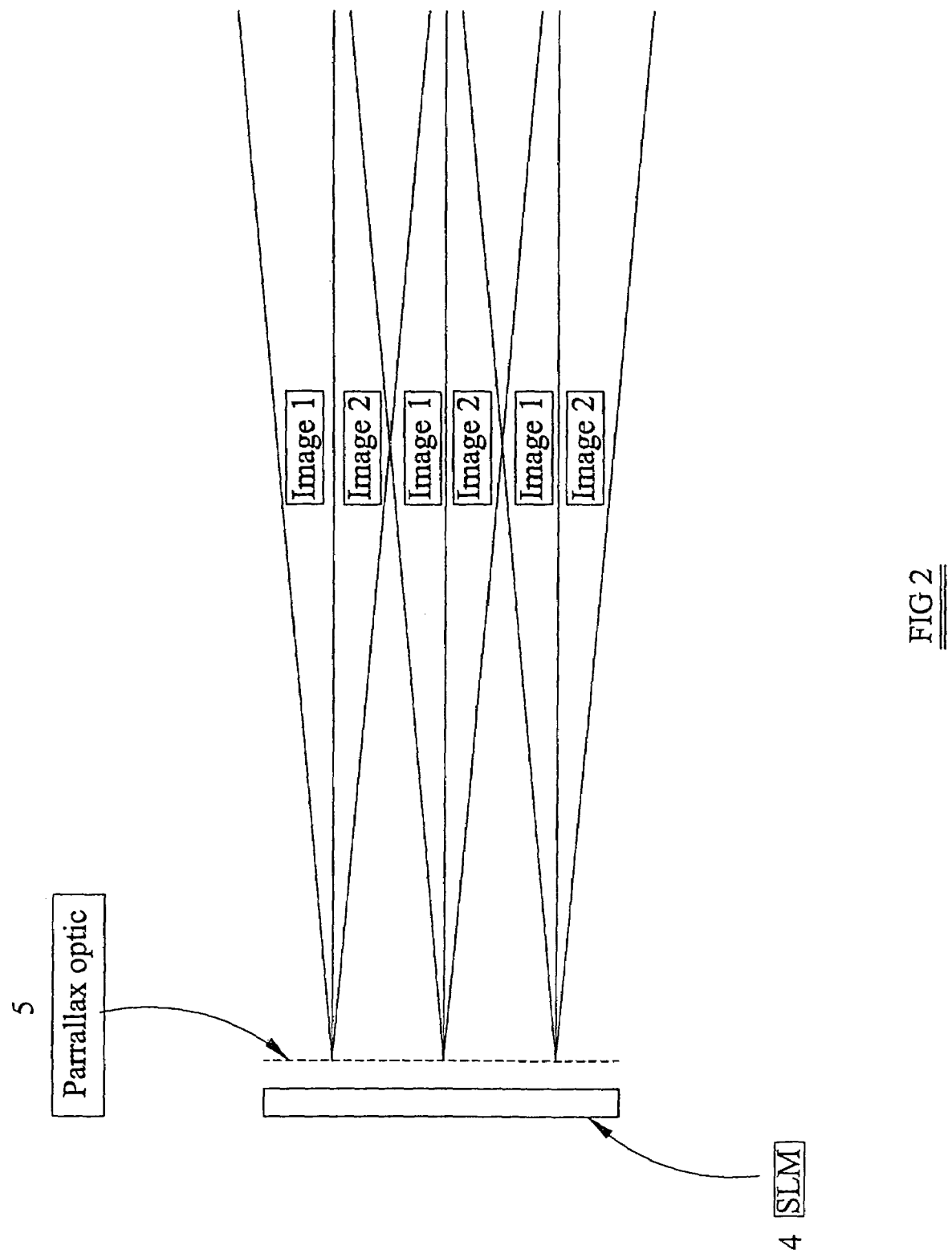
FIG. 2 illustrates diagrammatically the formation of non-viewpoint corrected viewing regions with a display of the type shown in FIG. 1.
Figure 3:
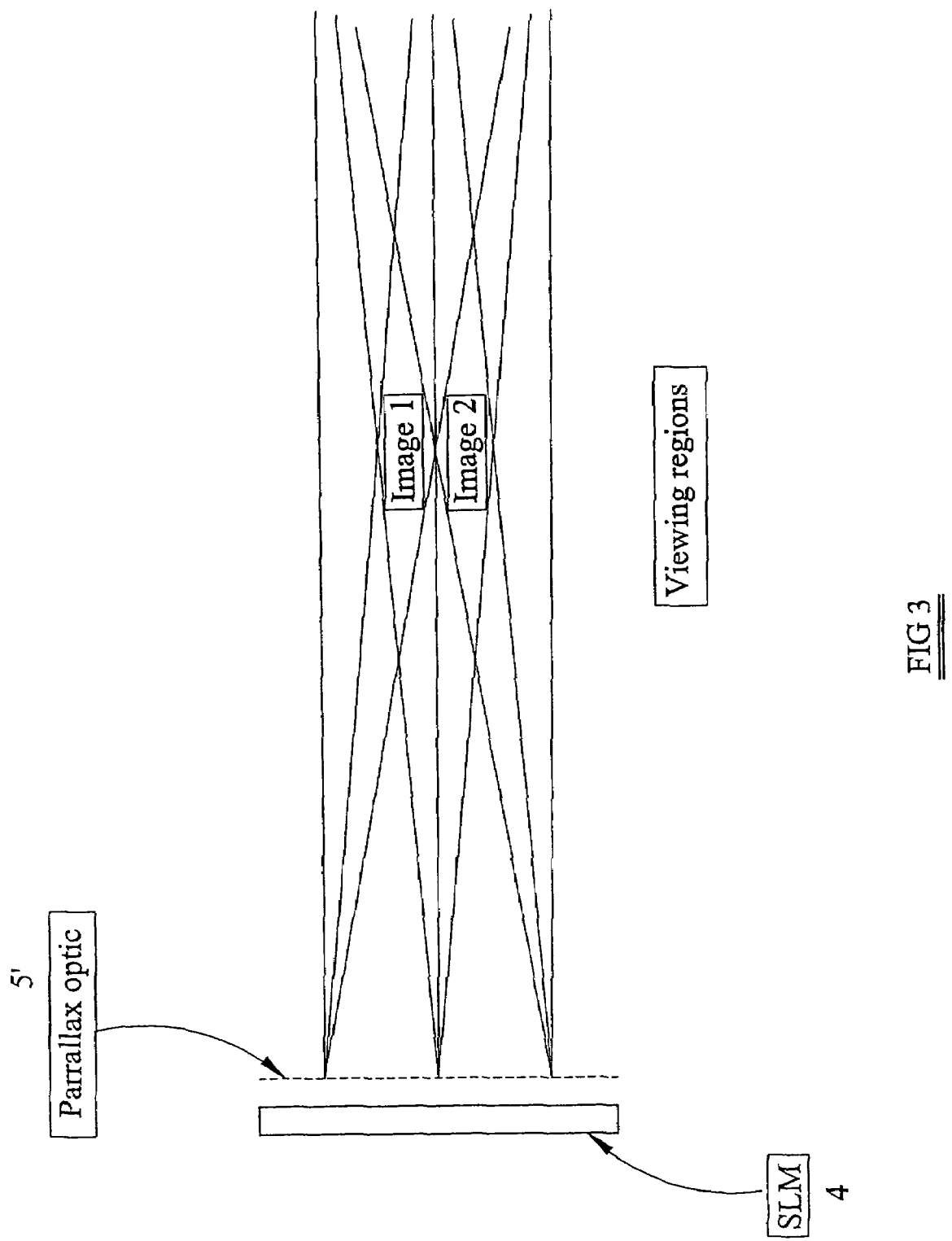
FIG. 3 illustrates diagrammatically the use of viewpoint correction.
Figure 4:
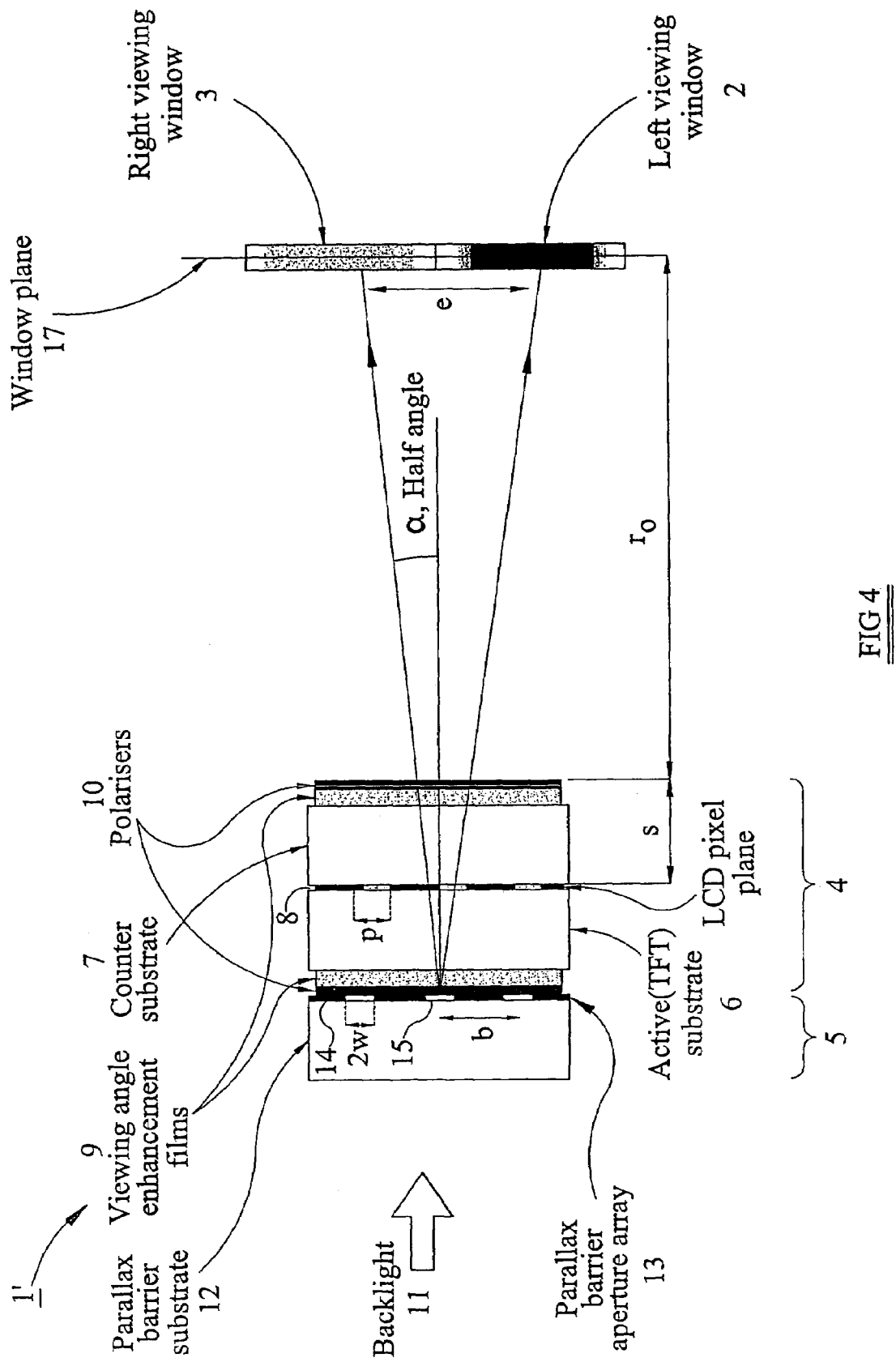
FIG. 4 is a diagrammatic horizontal cross-sectional view of a known type of rear parallax barrier autostereoscopic display.
Figure 5:
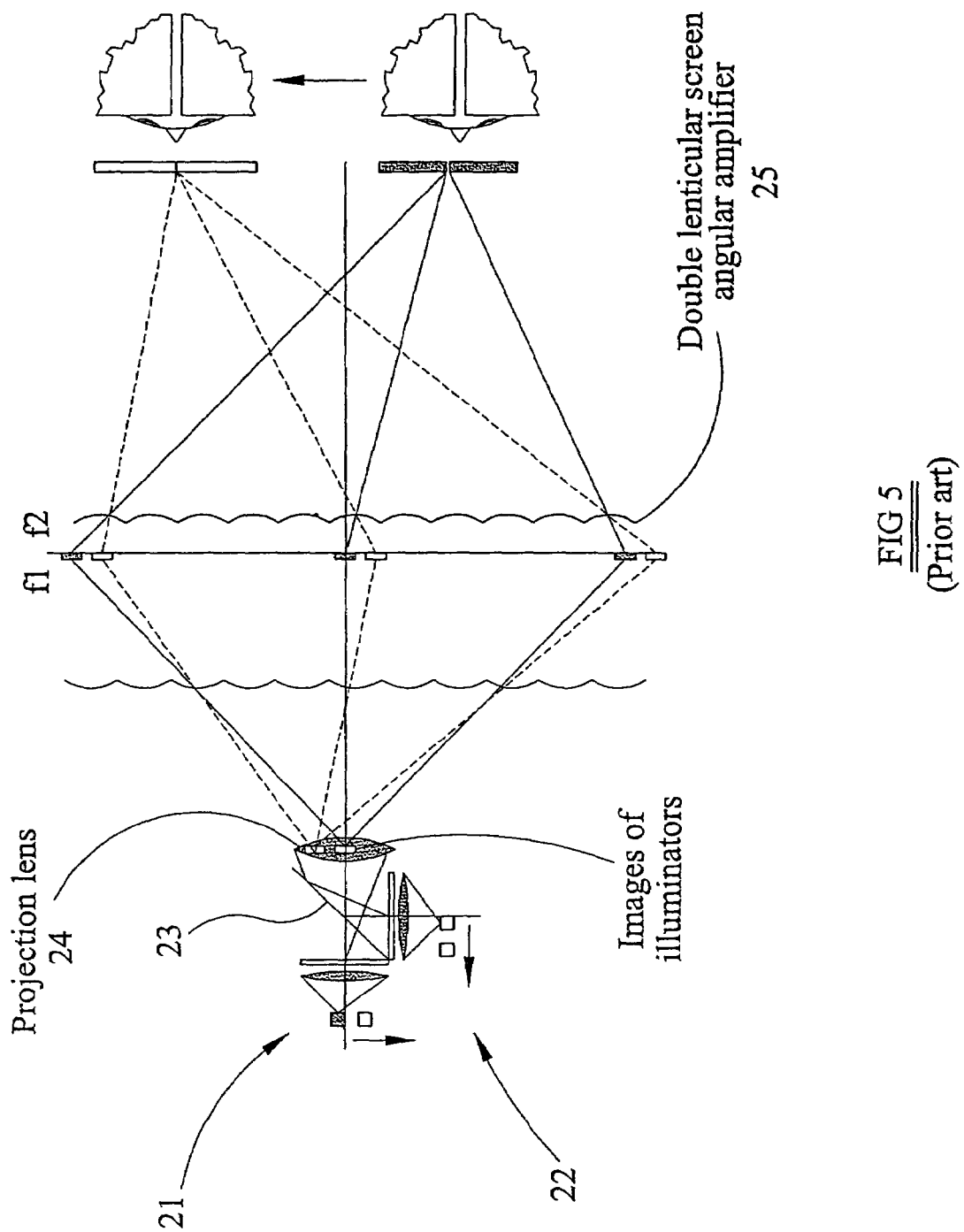
Figure 7:
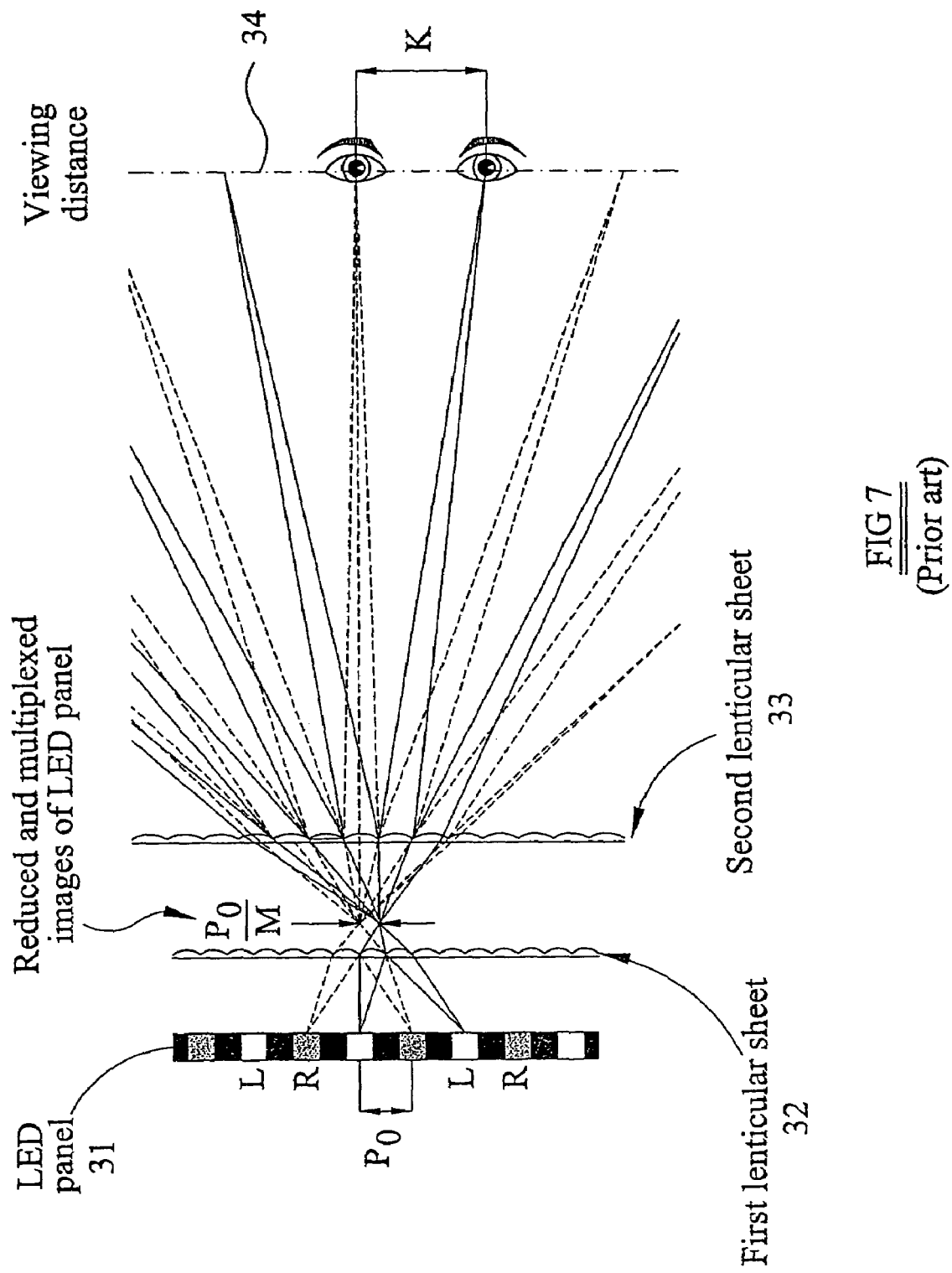

FIG. 8 illustrates installation of a display 40 in a relatively narrow car 41 and in a relatively wide lorry 42. The multiple view display is of the dual view type and is illustrated diagrammatically as comprising a liquid crystal device (LCD) 43 having alternating columns of pixels displaying interlaced vertical strips of a left viewer image L and a right viewer image R. A parallax optic in the form of a lenticular screen 44 is separated from the pixel plane of the LCD 43 by the thickness of an LCD substrate and associated layers which, in this example, is approximately 0.7 millimeters. The display is of the front parallax optic type but, as in the case of all of the embodiments described hereinafter, could also be of the rear parallax optic type.

An optical system 45 is disposed on the front of the lenticular screen 44 and comprises an array of diverging lenses in the form of plano-concave lenses, whereas the lenses or lenticules of the lenticular screen 44 are plano-convex lenses. The combination of the LCD 43 and the lenticular screen 44 forms a directional display sub-system, which directs light from the left and right views in respective different directions having an angular separation determined by the parameters of the LCD 43 and the lenticular screen 44. In particular, the angular separation between the viewing directions from this sub-system is relatively small and is smaller than required for the respective views to be visible to a driver 46 and a front-seat passenger 47. The optical system 45 in the form of the diverging optics or lenses increases the angular separation between the viewing directions to a value illustrated as 40 in this example so that each of the driver 46 and the passenger 47 sees the view intended for him or her whereas the other view is not substantially visible.

In the case of the wide lorry 42, a larger viewing angle separation is required. In order to achieve this, the same display sub-system is used with a different or differently positioned optical system 45 so as to provide a viewing angle separation of 80 in this example, as required by the positions of the driver 46 and the passenger 47 in the lorry 42.

For convenience, the display sub-system comprising the LCD 43 and the parallax optic 44 may be manufactured as a standard item for use in a wide range of applications requiring different viewing angle separations. During installation, each display is then adapted or arranged to provide the desired viewing angle separation by installing the appropriate optical system 45 and/or positioning the optical system. It is therefore unnecessary to manufacture a range of complete displays having different viewing angle separations.

Figure 9:
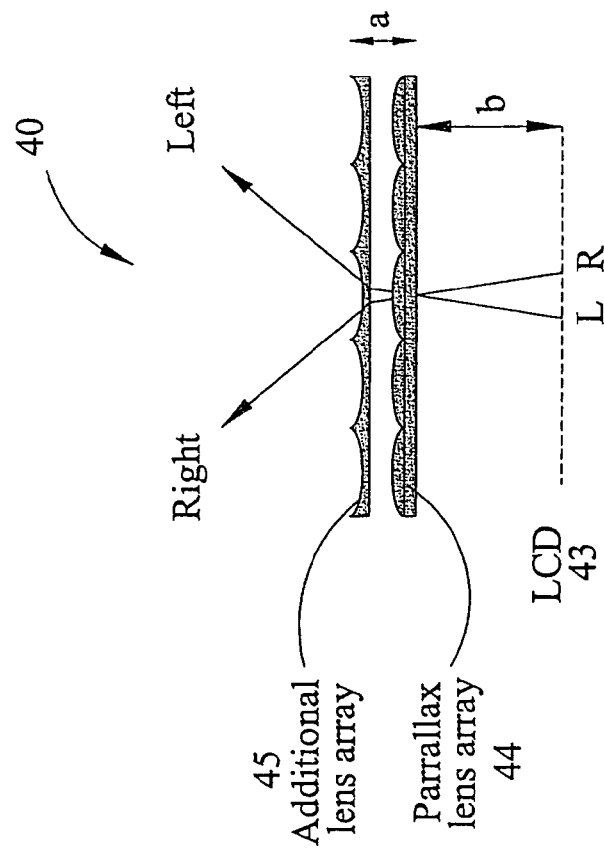
Figure 9:
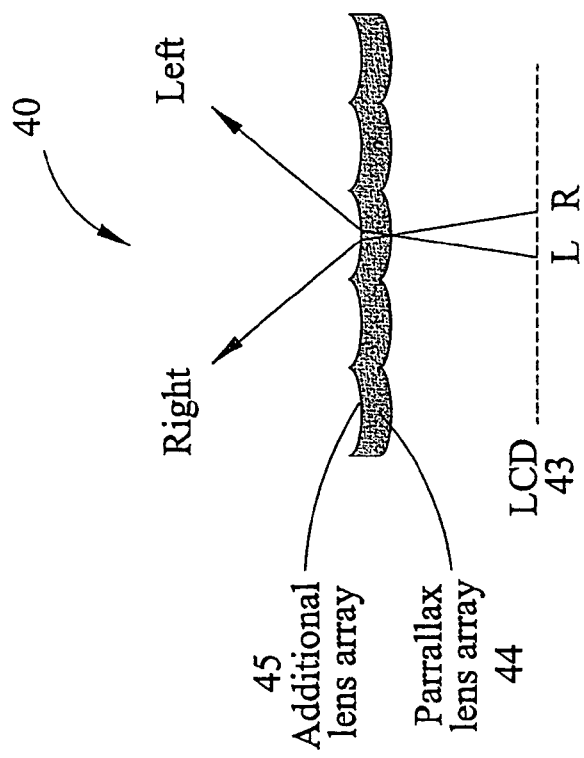

FIG. 9a illustrates a dual view display of the type illustrated in FIG. 8 and comprising an LCD 43, a parallax lens array in the form of a lenticular screen 44, and an optical system in the form of an "additional" lens array 45. The lenses of the array 44 focus the LCD 43 outside the array 45 and the combination of the lens arrays 44 and 45 forms a real image of the LCD at or adjacent the viewing plane of the display, which is the plane in front of the display in which the viewer is intended to be located. Thus, the pixel plane of the SLM is substantially focussed in the plane of the user in front of the display. The increase in viewing angle separation is dependent on the focal lengths of the lens arrays 44 and 45 and the separation therebetween. These parameters are therefore selected in order to achieve the desired viewing angle separation and the desired user viewing distance from the display 40.

The pitch of the lenses of the array 45 may be optimised in substantially the same way as the pitch of the parallax optic formed by the lens array 44, which may alternatively be a parallax barrier or any other suitable parallax optic. This is required in order to achieve the formation of good viewing windows. In the embodiments illustrated, each lens of the array 45 is associated with a respective lens of the array 44 but this is not necessary and other arrangements may be used.

The display 40 shown in FIG. 9b differs from that shown in FIG. 9a in that the lens arrays 44 and 45 are combined into a single element or sheet.

Figure 10:
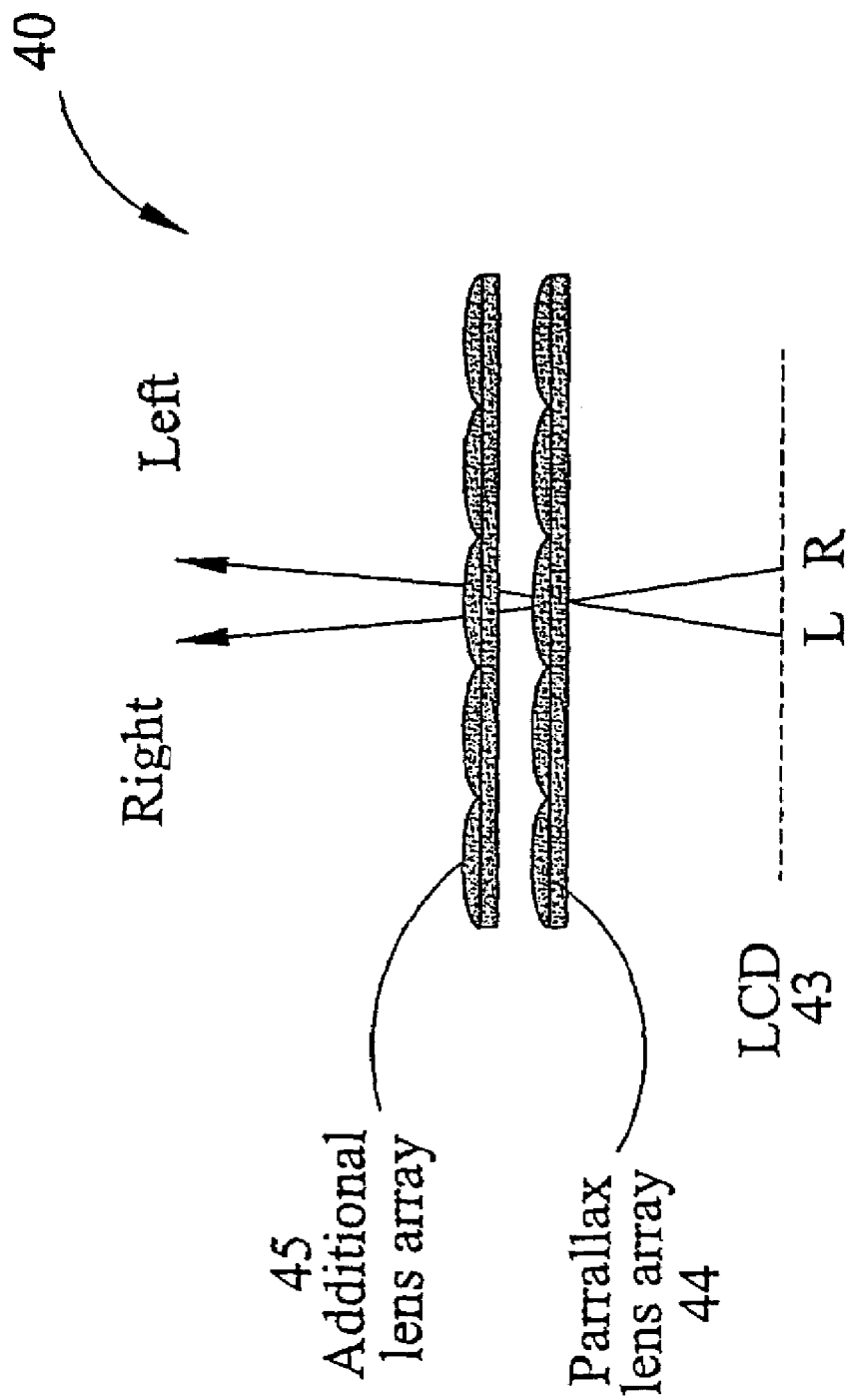

The display 40 shown in FIG. 10 differs from that shown in FIG. 9a in that the additional lens array or lenticular screen 45 of FIG. 10 comprises converging lenses illustrated as plano-convex cylindrical lenses. The effect of this is to reduce the viewing angle separation in the display of FIG. 10.

Figure 11:
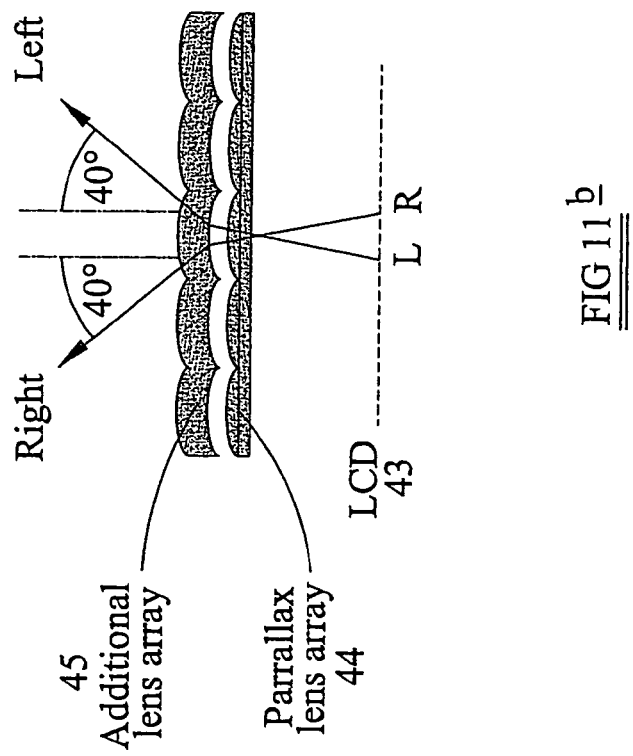
Figure 11:
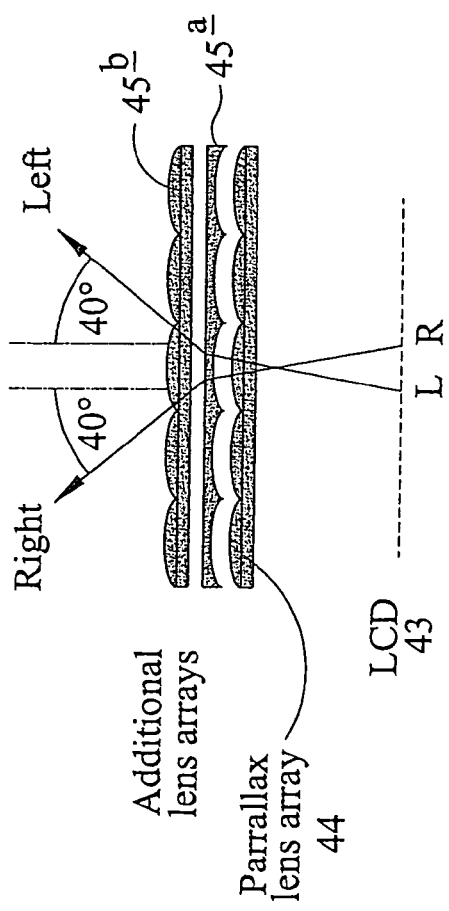

The display of FIG. 11a differs from that shown in FIG. 9a in that the optical system comprises two additional lenticular screens 45a and 45b, which cooperate so as to produce the same effect of increasing the viewing angle separation produced by the display sub-system comprising the LCD 43 and the lenticular screen 44. The lenticular screens 44a and 44b are illustrated as an array 45a of diverging elements between the parallax optic comprising the lenticular screen 44 and an array of converging lenses forming the lenticular screen 45b. Such an arrangement may allow the specification required for the focal length of the individual lenses or elements to be reduced and may allow distortions in the system to be more easily overcome.

As shown in FIG. 11b, the lenticular screens 45a and 45b may be combined into a single element or sheet 45.

FIGS. 12a and 12b illustrate a display of the type shown in FIG. 9a in a dual view mode of operation and in a normal or single view non-directional mode of operation. The divergent lenses of the lenticular screen 45 are separated from the lenses of the lenticular screen 44 by a cavity containing a layer of material whose refractive index may be varied or controlled. The layer is illustrated as a liquid crystal layer 50 and may be provided with the appropriate control means, such as opposing electrodes and an arrangement for applying a variable voltage across the electrodes so as to control the refractive index of the layer 50.

In the dual view mode of operation illustrated in FIG. 12a, the layer 50 is controlled so as to have a refractive index which is different from the refractive indices of the screens 44 and 45 so that refraction occurs at the interfaces and the display 40 operates as described hereinbefore. In the "normal" or non-directional mode of operation illustrated in FIG. 12b, the layer 50 is controlled so as to have a refractive index which is substantially equal to the refractive indices of the screens 44 and 45. Thus, substantially no refraction occurs at the interfaces of the layer 50 with the screens 44 and 45 so that the display operates as a non-directional display. A single image may be displayed by the LCD or spatial light modulator (SLM) 43 and is viewable throughout a range of vertical and horizontal viewing angles.

The refractive index of the layer 50 may be switchable between two values as described hereinbefore so as to switch between one dual view mode and the normal mode. Alternatively, the refractive index may be controlled to have other discrete values or any value within a continuous range of values so as to vary the refraction and hence the optical power of the lenticular screens 44 and 45. This may be used to control the display 40, for example to provide different viewing angles, different viewing angle separations and/or different viewing distances. Thus, the display may be controlled so as to provide improved or optimum display quality in a range of installations with a range of viewing angles and viewing distances. If a viewer tracking system is provided, this may be used to control the refractive index of the layer 50 in accordance with the position of a viewer.

FIGS. 13a and 13b illustrate dual view and normal modes of a display 40 which differs from that shown in FIGS. 12a and 12b in that the layer 50 is replaced by a layer 52 of birefringent material illustrated as polymerised liquid crystal. In addition, a polarisation switch 53 and polarisers 54 and 55 are provided. The polymerised liquid crystal layer 52 has a first refractive index for a first polarisation direction of light passing therethrough matching the refractive indices of the lenticular screens 44 and 45. The layer 52 has a second refractive index, for light with the orthogonal polarisation direction, which does not match the refractive indices of the screens 44 and 45. Thus, light with the first polarisation direction is not refracted by the lenses so that the display 40 acts as a non-directional display in the normal mode as illustrated in FIG. 13b. Light of the orthogonal polarisation direction is refracted by the lenses of the screens 44 and 45 so that the display 40 operates in the dual view mode as described hereinbefore.

The polarisation switch together with the polariser 55 selectively transmits light of the first or second polarisation directions and is thus used to switch between the dual view mode and the normal mode of operation. For example, the polarisation switch 53 may comprise a liquid crystal material and an electrode and control arrangement which permit switching between modes in which light of orthogonal polarisation directions is passed.

Switching between dual view and normal modes using the polarisation switch 53 also has the effect of switching between normally black and normally white LC modes of the display, at least in this embodiment. Accordingly, when the mode is switched, the data supplied to the SLM 43 are inverted to compensate for this.

The display shown in FIG. 14 differs from that shown in FIG. 9a in that the parallax optic 44 is in the form of a parallax barrier having vertical parallel evenly spaced slits such as 44a and the lens array is replaced by a prism structure forming the optical system 45. The prism structure 45 increases the viewing angle separation from the display sub-system comprising the SLM 43 and the parallax optic 44. The distances illustrated at a, b and c may be selected or optimised, for example so as to reduce or minimise crosstalk and so as to achieve the desired viewing angle separation.

In the case of a rear parallax barrier display of the same basic type as shown, for example, in FIG. 14, the prism structure 45 may be replaced by Fresnel prisms, which may be disposed in the pixel plane of the SLM 43.

FIG. 15 illustrates a display 40 which differs from that shown in FIG. 14 in that the prism structure 45 is reversed so as to reduce the viewing angle separation instead of increasing it. In this embodiment, although diffuse illumination is illustrated, collimated light may be used to decrease image mixing or crosstalk.

Figure 16:
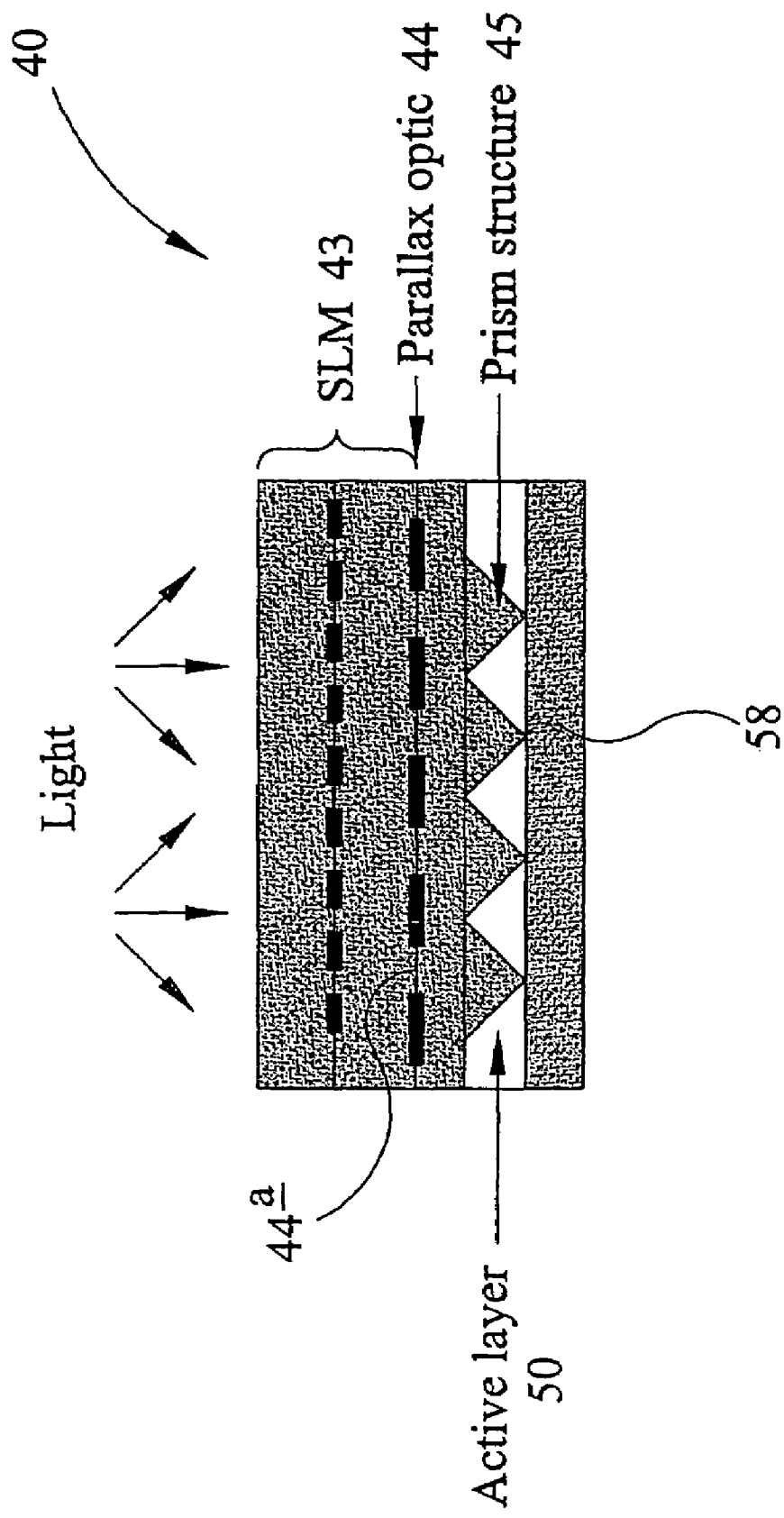

FIG. 16 illustrates a display 40 of the type illustrated in FIG. 15 but including an active liquid crystal layer 50 of the type illustrated in FIGS. 12a and 12b. As described hereinbefore, the refractive index of the layer 50 may be controlled so as to switch between dual view and normal modes and/or so as to vary the change in viewing angle separation. A substrate 58 is illustrated in FIG. 16 for enclosing the liquid crystal of the layer 50.

Figure 17:
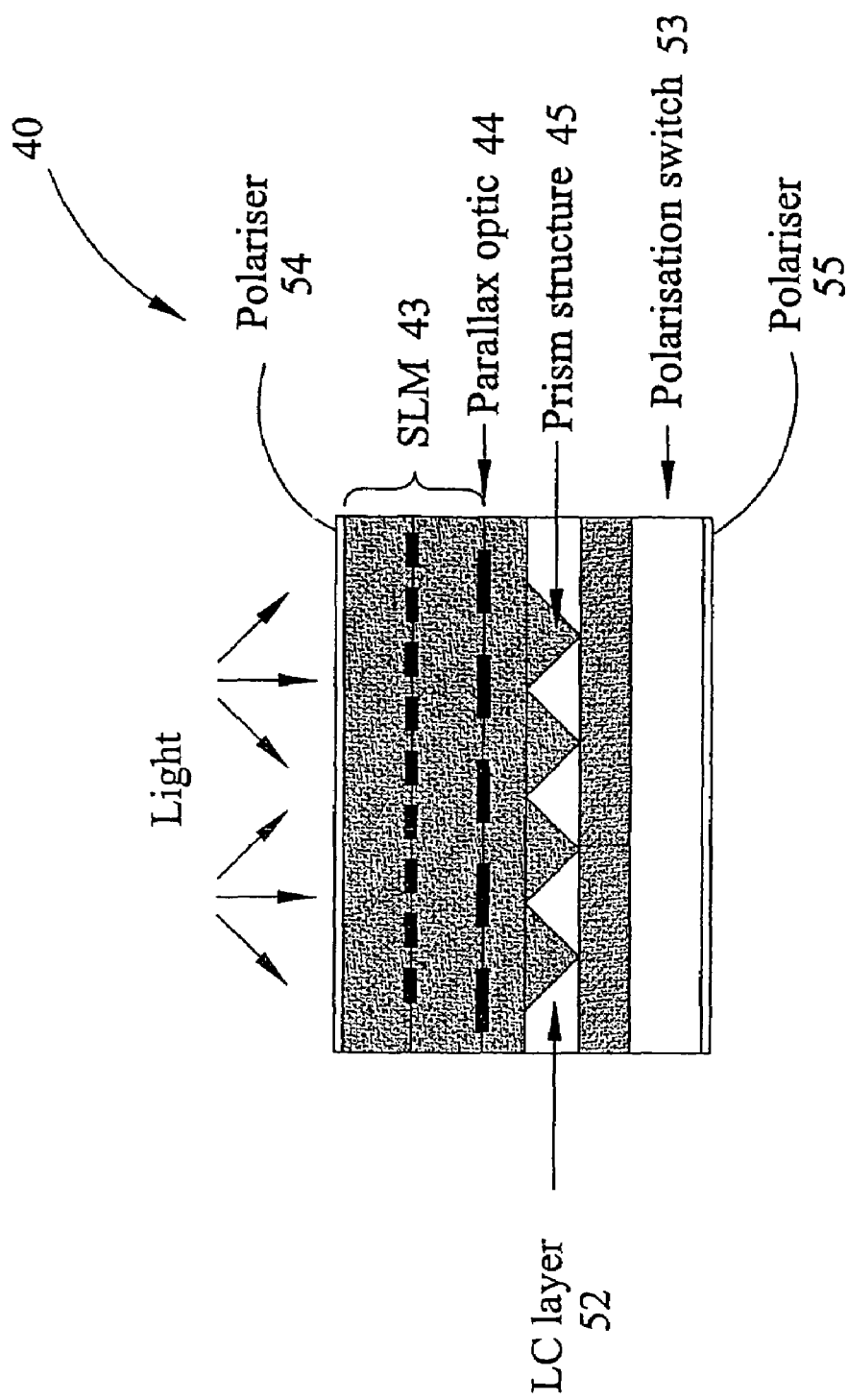

The display shown in FIG. 17 is of the type illustrated in FIG. 15 but including the polymerised liquid crystal layer 52, the polarisation switch 53 and the polarisers 54 and 55 as shown in FIGS. 13a and 13b. Operation of the display of FIG. 17 to select between dual view and normal modes of operation is as described hereinbefore except that, when the parallax optic 44 is a parallax barrier which continues to function in the normal or single view mode of operation, the horizontal viewing angle range in this mode is restricted. However, the parallax barrier 44 may be of the type which is switchable between a parallax barrier mode and a mode in which the parallax barrier structure is substantially ineffective or invisible so as to permit a wider viewing angle range in the single view mode of operation.

Figure 18:
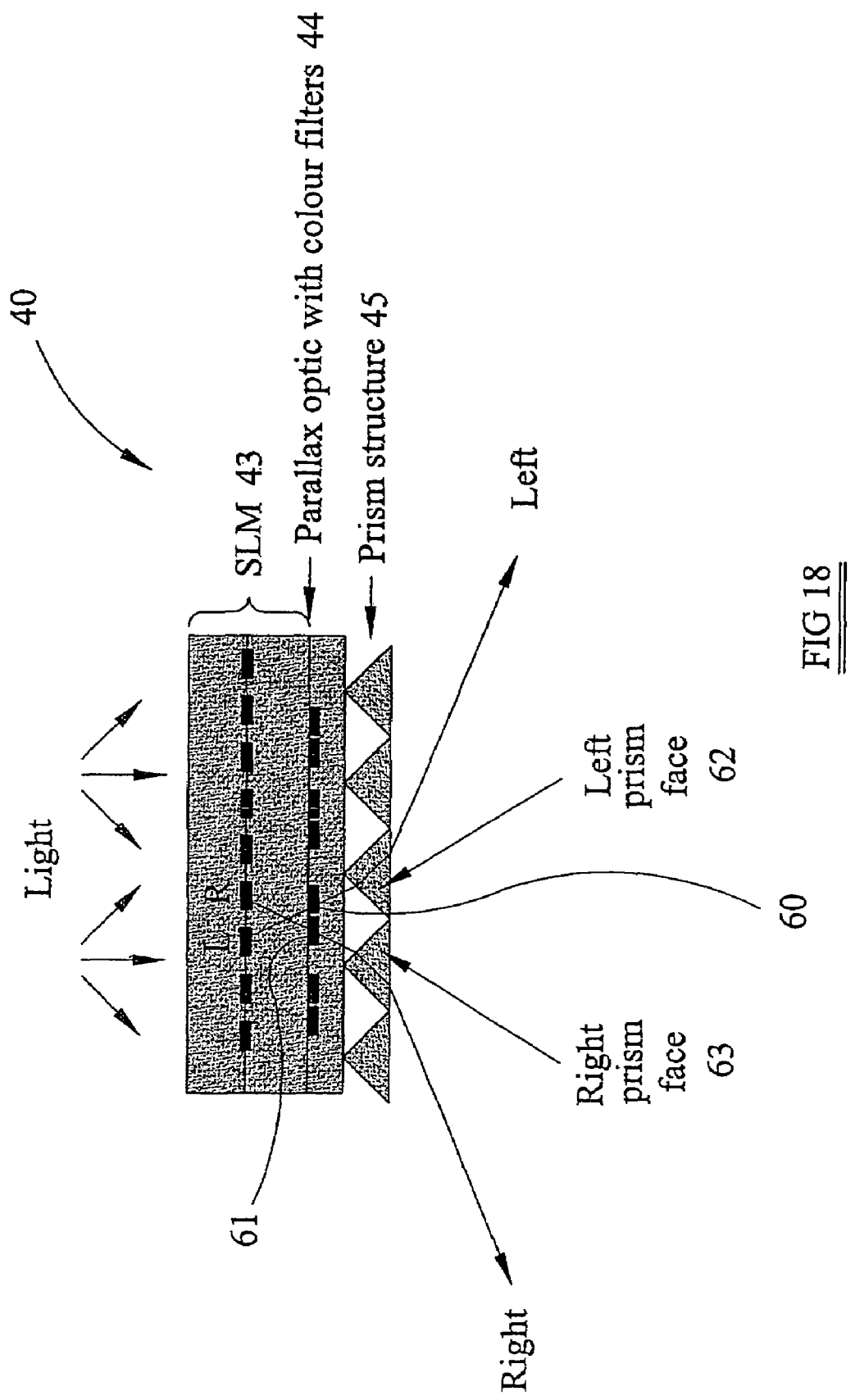

The display 40 shown in FIG. 18 is of the same type as that shown in FIG. 14 but with the parallax barrier or optic 44 being of the type which has colour filters in the slits. The SLM 43 includes colour filtering such that each pixel effectively transmits light of a single colour, such as red, green or blue. Each slit of the barrier 44 cooperates with a pair of columns of pixels with the pixels L displaying the left image strip being of one colour and the pixels R displaying the right image strip being of a different colour. Each slit includes a filter 60 for transmitting light from the left image pixels L and for substantially blocking light from the right image pixels R and a filter 61 for passing light from the right image pixels R and for blocking light from the left image pixels L Such an arrangement ensures that substantially only light from the left image pixels L reaches the left hand side face 62 of each prism of the structure 45. Similarly, this arrangement ensures that substantially only light from the right image pixels R reaches the right hand side face 63 of each prism of the structure 45.

Figure 19:
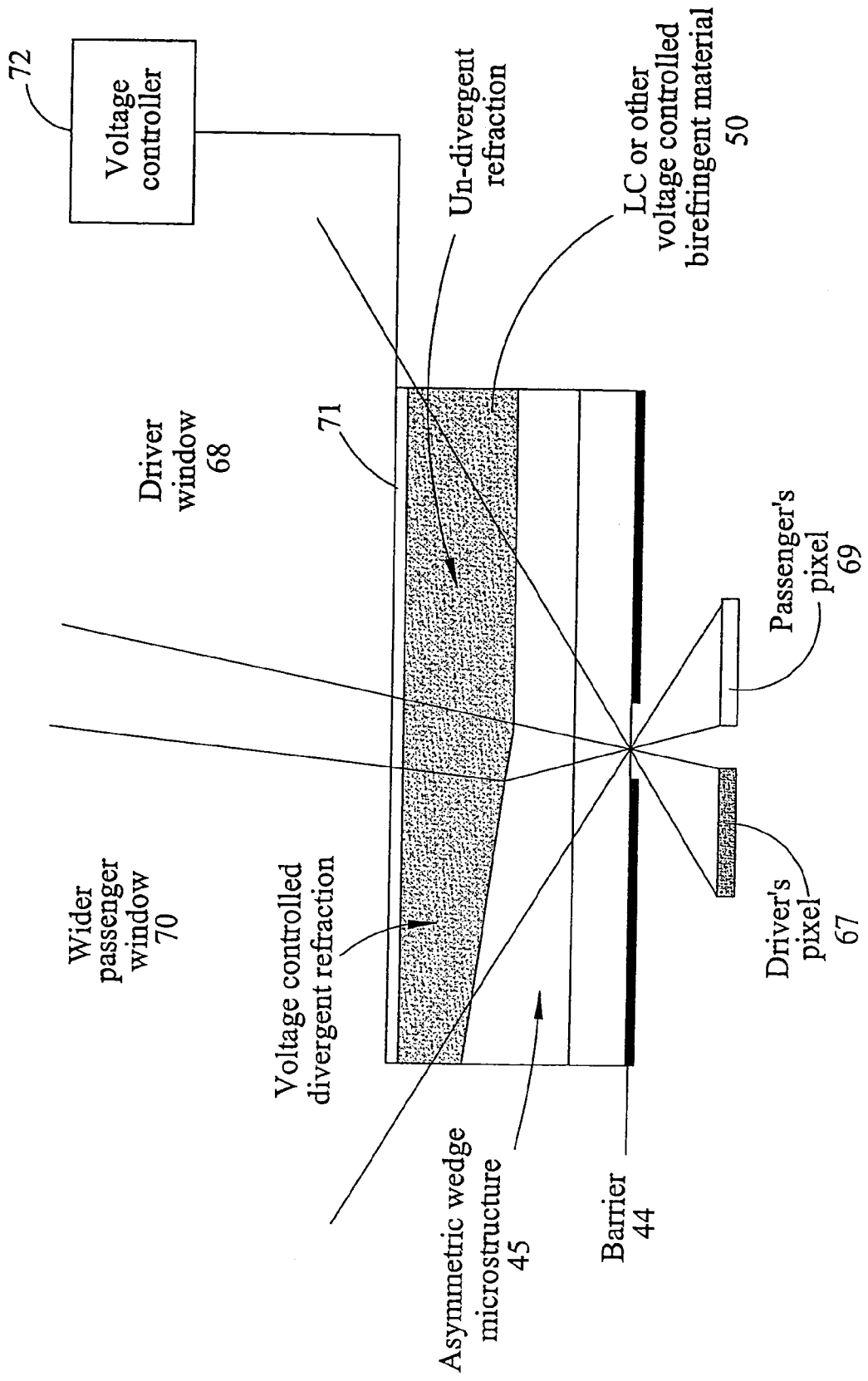
Figure 19:
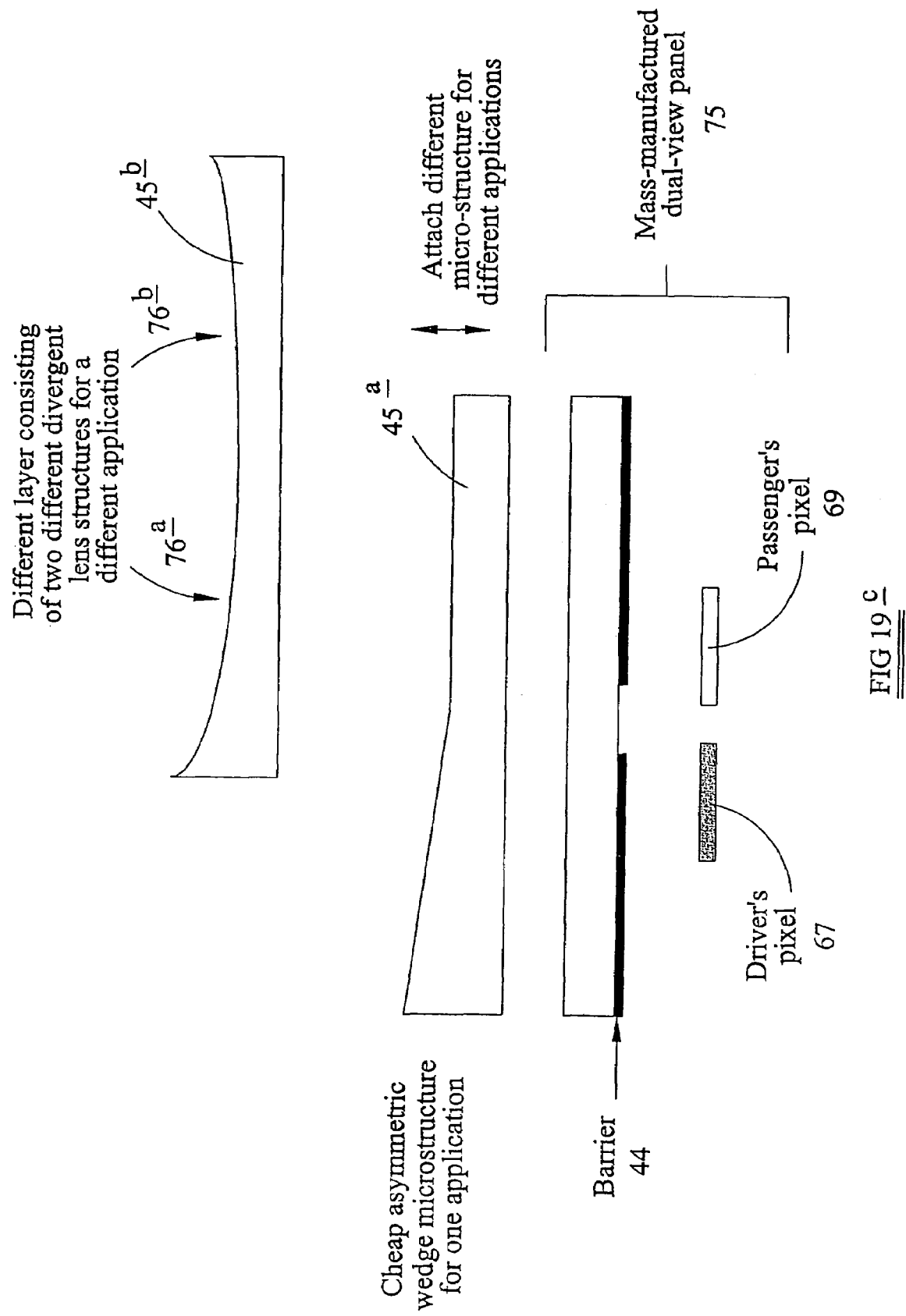

FIG. 19*a* illustrates a display 40 and another type of optical system 45 in the form of a diverging element comprising individual optic elements having a wedge portion 65 and a plane non-inclined portion 66. Such an arrangement provides asymmetric left and right viewing directions with respect to a normal to the display surface. For example, as illustrated in FIG. 19*a*, pixels such as 67 display an image for the driver of a vehicle in which the display 40 is installed to provide a "driver window 68" in the form of an angular range within which the image intended for the driver may be viewed. Light from the pixels such as 67 passes through the plane portions 66 of each element of the wedge microstructure layer 45 and is subjected to non-divergent refraction.

Light from pixels such as 69 displaying an image intended for a passenger passes through the wedge portion or structure 65 and is subjected to divergent refraction. This creates a passenger window 70 which is wider than the driver window 68 in that the angular viewing range is larger so that the image intended for the passenger may be viewed in a wider viewing range.

FIG. 19*b* illustrates a display of the type shown in FIG. 19*a* including a layer 50 of the type illustrated in FIGS. 12*a* and 12*b*. An electrode 71 and a voltage controller 72 for controlling the refractive index of the layer 50 are shown in FIG. 19*b*. Operation of the display to switch between single and dual view modes of operation or to vary the viewing angle separation is as described hereinbefore.

FIG. 19*c* illustrates a display of the same general type as illustrated in FIG. 19*a* but in which, as described hereinbefore, the parallax optic in the form of the parallax barrier 44 and the LCD containing the pixels 67 and 69 are mass-manufactured as a "dual-view panel" 75. Different optical systems may then be attached to the panel 75 before, during or after installation of the display for a particular application. In particular, different optical systems may be selected to achieve the desired viewing angle separation, viewing angles and/or viewing distance for different applications. FIG. 19*c* illustrates the structure of each element of two different types of optical systems. One element is in the form of the asymmetric wedge microstructure 45*a* as shown in FIG. 19*a* whereas the other element 45*b* is an asymmetric diverging lens element in the form of two different divergent lens structures 76*a* and 76*b*. Such an arrangement allows mass-manufacture of relatively expensive panels 75 but with relatively cheap manufacture of optical systems for specific applications.

What is claimed is:

1. A multiple view display for displaying first and second images respectively to first and second observers spaced laterally apart, the multiple view display comprising:

a display device arranged to display spatially multiplexed first and second images, wherein the display device includes a pixel plane and a substrate through which said first and second images are transmitted from the pixel plane;

a parallax optic arranged to cooperate with said display device to direct light from said first and second images in first and second directions, respectively, with a first angular separation between the first and second directions; and a first optical system for receiving said light from said first and second directions and for directing said light in first and second viewing directions, respectively, to a front plane surface of the first optical system, the first and second viewing directions having a second angular separation different from said first angular separation such that the first observer views the first image from the first viewing direction and the second image is substantially not visible to the first observer, and the second observer views the second image from the second viewing direction and the first image is substantially not visible to the second observer, wherein the multiple view display is configured to provide a plurality of different angles for the second angular separation of the first and second viewing directions of the first and second observers by repositioning the first optical system with respect to the parallax optic or by using a second optical system instead of the first optical system, wherein the second optical system has an optical characteristic different from an optical characteristic of the first optical system, wherein the front plane surface of the optical system, which represents a front surface of the multiple view display, is parallel with the pixel plane of the display device, and wherein either optical system has a divergent lens function.

2. A display as claimed in claim 1, in which said second angular separation is greater than said first angular separation.

3. A display as claimed in claim 1, in which said either first or second optical system comprises an array of optical elements, in which each of said elements comprises a lens.

4. A display as claimed in claim 3, in which each said lens is a diverging lens.

5. A display as claimed in claim 4, in which each said optical system comprises a further lens array of converging lenses.

6. A display as claimed in claim 3, in which said array of optical elements is combined with said parallax optic.

7. A display as claimed in claim 3, in which said array has a non-plane surface, said display comprises a layer of material whose refractive index is controllable, and said layer has a surface which matches and is in contact with said non-plane surface.

8. A display as claimed in claim 7, in which said layer has a controllable range of refractive indices including a refractive index of said array.

9. A display as claimed in claim 7, in which said material of said layer is a liquid crystal material.

10. A display as claimed in claim 3, in which said array has a non-plane surface, said display comprises a layer of birefringent material, and said layer has a surface which matches and is in contact with said non-plane surface.

11. A display as claimed in claim 10, in which said birefringent material has first and second refractive indices, one of which is substantially equal to a refractive index of said array.

12. A display as claimed in claim 10, in which said birefringent material is a polymerised liquid crystal.

13. A display as claimed in claim 10, comprising a polarisation switch for selectively switching a polarisation of light passing through said layer.

14. A display as claimed in claim 13, comprising a polariser for receiving light from said polarisation switch.

15. A display as claimed in claim 1, in which said display device comprises a liquid crystal device.

16. A display as claimed in claim 1, comprising a driving arrangement for driving said display device so as to display said multiplexed first and second images.

* * * * *

UNITED STATES PATENT AND TRADEMARK OFFICE
CERTIFICATE OF CORRECTION

| | |
|---|---|
| PATENT NO. | : 7,580,186 B2 |
| APPLICATION NO. | : 10/927724 |
| DATED | : August 25, 2009 |
| INVENTOR(S) | : Mather et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 163 days.

Signed and Sealed this

Fourteenth Day of September, 2010

David J. Kappos
*Director of the United States Patent and Trademark Office*